No. 818,432. PATENTED APR. 24, 1906.
O. J. GARLOCK.
ROD PACKING.
APPLICATION FILED NOV. 18, 1905.
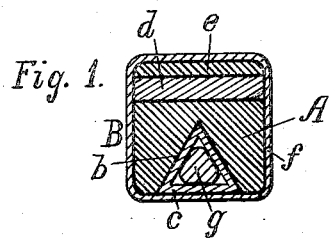
Fig. 1.
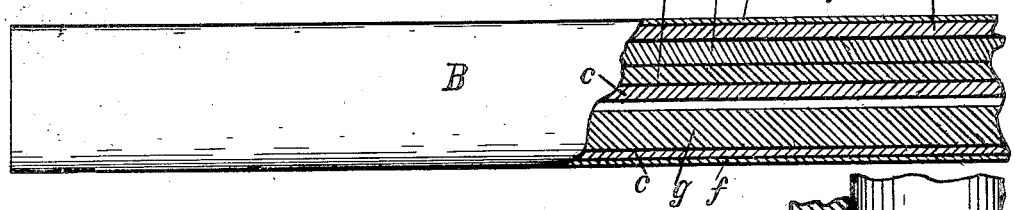
Fig. 2.
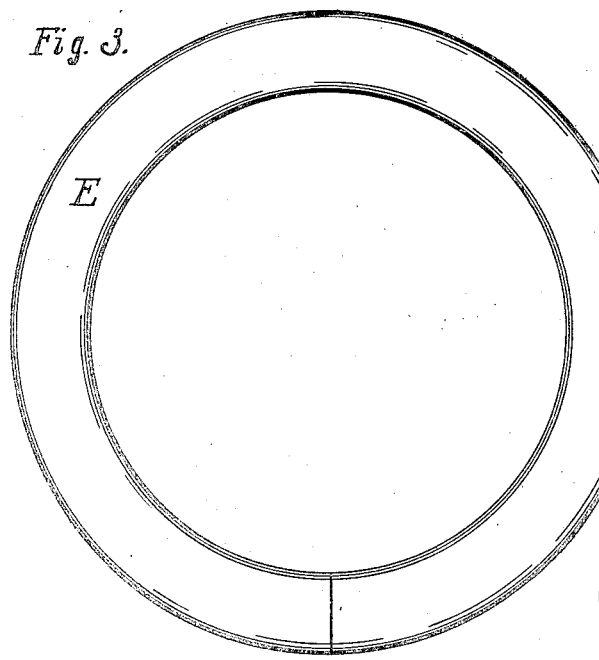
Fig. 3.
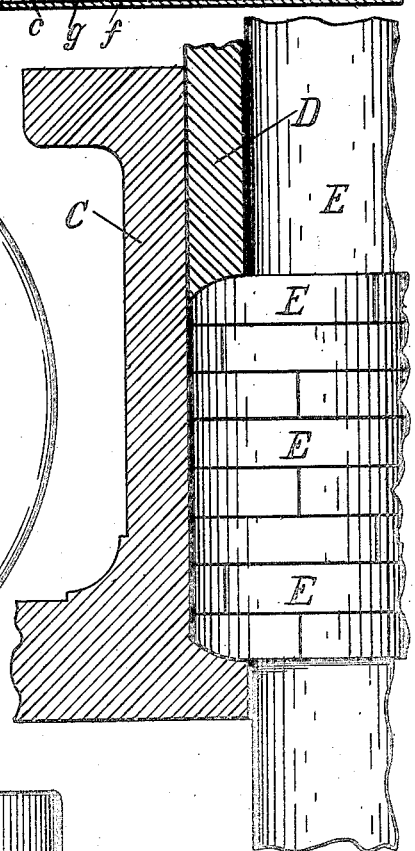
Fig. 4.
Fig. 5.
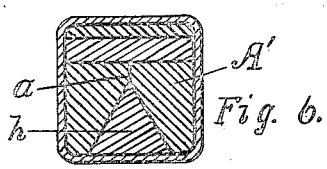
Fig. 6.
Attest:
O. M. Whitmore.
E. M. Walzer.
Inventor:
O. J. Garlock.
by E. B. Whitmore,
Atty.

UNITED STATES PATENT OFFICE.

OLIN J. GARLOCK, OF PALMYRA, NEW YORK.

ROD-PACKING.

No. 818,432.      Specification of Letters Patent.      Patented April 24, 1906.

Application filed November 18, 1905. Serial No. 288,042.

*To all whom it may concern:*

Be it known that I, OLIN J. GARLOCK, of Palmyra, in the county of Wayne and State of New York, have invented a new and useful Improvement in Rod-Packings, which improvement is fully set forth in the following specification and shown in the accompanying drawings.

My present invention is an improved packing for piston-rods, designed more particularly for use with the slower-moving rods of large and powerful steam-engines and hydraulic pumps for heavy work, such rods having large diameters—of twenty-four inches, more or less. Packing for these classes of heavy machinery needs to be firm and strong and composed of parts and elements of such nature and so arranged as to withstand severe or powerful pressures by the glands while in the stuffing-boxes. The ropes or cables of packing for this use are of necessity stiff and slow to yield to a stress of flexure, the packing being fitted more particularly to be formed into rings of large diameters. In consideration of the services required of packing for this heavy machinery I have devised and produced the packing herewith shown and described.

One object of my invention is to produce a rope or cable of packing of such material and so constructed as to be firm and to withstand powerful compressive action by the gland while in the stuffing-box.

Another object of the invention is to provide the packing with a flexible metallic element in position to meet the rod and sustain the main part of the wear and abrasion the packing is subjected to.

A further object of the invention is to provide a convenient packing that will be more durable and give longer service than the similar packings heretofore used.

Other objects and advantages of the invention will be brought out and made to appear in the following specification and the construction particularly pointed out in the appended claims, reference being had to the accompanying drawings, which, with the reference characters marked thereon, form a part of this specification.

Figure 1 is a transverse section of a cable or rope of this improved packing. Fig. 2 is a side view of a portion of the rope, partly in longitudinal axial section. Fig. 3 is a plan of a ring of packing made from the rope. Fig. 4 is an edge view of the ring seen as indicated by arrow in Fig. 3. Fig. 5 shows the application of the packing to a stuffing-box, parts broken away and other parts sectioned through the axis of the rod. Fig. 6 shows in transverse section a slight modification in the construction of the packing.

Referring to the parts shown in the drawings, A, Figs. 1, 2, and 6, is a strip or body of canvas ducking constituting the main strand or body of the rope B, of packing, which strand may be in a single piece or divided longitudinally at $a$, as shown in Fig. 6, into two equal and similar right and left parts or halves, as may be found convenient and desirable. Whether divided or in a single piece the body A as a whole is substantially rectangular in cross-section, a longitudinal groove $b$, V shape in cross-section, being formed at one side, as clearly shown in Figs. 1 and 6. Within the groove $b$ and to fit and fill the latter is placed a leaden tube $c$ of triangular cross-section, one side of which tube being in the plane of the adjacent side of the strand or member A, as appears in Fig. 1.

A strip of india-rubber $d$, rectangular in cross-section, is placed against the rear or back surface of the body A on the side opposite the groove $b$, the width of the strip corresponding with that of the body A, as shown. Back of the strip $d$ is a second strip $e$, of canvas ducking, the whole being wrapped or inclosed by a sheath or covering $f$, of cloth, preferably canvas ducking. When the rope or cable B is formed into packing-rings E, Figs. 3, 4, and 5, it is bent in a manner to have the leaden strand $c$ at the concave side of the rings so as to be adjacent to the rod F, Fig. 5, when placed in a stuffing-box C.

I prefer to place a cord or strand $g$, of expansible india-rubber, within the leaden tube $c$, as clearly shown in Figs. 1 and 2, which, acting laterally outward against the walls of the tube, tends to prevent the walls from sinking or becoming bent inward by the pressure against the tube from without. This strand $g$ becoming expanded by the action of the heat to which the packing is subjected presses outward against the sides of the tube, the expanding of the inclosed india-rubber strand causing it to substantially fill the tube.

The inclosing wrapper $f$ for the combined strands may be made of comparatively frail material, its use being only to hold the contained parts of the rope and the rings together and in place while in stock or otherwise previous to use. When the rings are in the stuffing-box and pressed by the gland D, the wrapper $f$ is of no further use, as all the component parts of the rings are confined and held in place in the box. The parts of the wrappers next the rod quickly wear away, allowing the leaden portions $c$ and the adjacent parts of the main strands A to come into direct contact with the surface of the rod and sustain the wear. These parts of the rings are firm and wear away very slowly, giving to the packing permanency and durability in the stuffing-box.

When making this packing for use with hydraulic pumps, it is sometimes desirable to form the metal strand solid, as shown at $h$ in Fig. 6, in which case the main strand of ducking A', as shown in the figure, is preferably divided at $a$ into two equal and similar members. This make of packing is more durable and lasts longer without renewal in the stuffing-box, being also desirable for use with the engines of heavy ocean-steamers making long continuous voyages during which it is not convenient to put an engine out of use for the purpose of renewing the packing of the piston-rod.

What I claim as my invention, and desire to secure by Letters Patent, is—

1. A packing for piston-rods, consisting of a main strand of soft material, as canvas ducking, having a longitudinal groove in one side, a metallic strand, as of lead, in the groove, and strands of different materials back of the main strand, and a wrapper for the whole.

2. A packing for piston-rods, comprising a main strand of fibrous material substantially rectangular in cross-section, having a longitudinal V-shape groove in one side, a hollow triangular strand of lead in said groove and filling the same, a strand of india-rubber in the leaden strand, and strands of different soft material back of the main strand, and an outside wrapper for the combined strands, the whole body being substantially square in cross-section.

3. A rope of rod-packing comprising a main strand of yielding material having a longitudinal groove in one side, a strand of flexible metal in said groove, a strand of india-rubber against the said main strand on the side opposite the metal strand, a strand of fibrous material against the india-rubber strand, all the strands except the metallic strand being substantially rectangular in cross-section, and a wrapper for the strands.

In witness whereof I have hereunto set my hand, this 16th day of November, 1905, in the presence of two subscribing witnesses.

OLIN J. GARLOCK.

Witnesses:
F. W. GRIFFITH,
JOHN L. TRAVERS.